United States Patent
Pana et al.

(10) Patent No.: US 9,021,419 B2
(45) Date of Patent: Apr. 28, 2015

(54) SYSTEM AND METHOD FOR SUPPORTING INTELLIGENT DESIGN PATTERN AUTOMATION

(71) Applicant: Oracle International Corporation, Redwood Shores, CA (US)

(72) Inventors: Mircea Pana, Ottawa (CA); Mark Pomerant, Ottawa (CA); Curtis DesRosiers, Mississauga (CA)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/769,042

(22) Filed: Feb. 15, 2013

(65) Prior Publication Data

US 2014/0237443 A1    Aug. 21, 2014

(51) Int. Cl.
G06F 9/44    (2006.01)

(52) U.S. Cl.
CPC ... *G06F 8/20* (2013.01); *G06F 8/35* (2013.01); *G06F 8/10* (2013.01)

(58) Field of Classification Search
None
See application file for complete search history.

(56) References Cited

U.S. PATENT DOCUMENTS

| | | | |
|---|---|---|---|
| 6,237,135 B1 * | 5/2001 | Timbol | 717/107 |
| 6,694,505 B1 * | 2/2004 | Tan | 717/100 |
| 6,701,381 B2 * | 3/2004 | Hearne et al. | 719/313 |
| 6,851,105 B1 * | 2/2005 | Coad et al. | 717/106 |
| 7,028,288 B2 * | 4/2006 | Wall et al. | 717/109 |
| 7,047,518 B2 * | 5/2006 | Little et al. | 717/108 |
| 8,689,173 B2 * | 4/2014 | Elaasar | 717/104 |
| 2002/0073396 A1 * | 6/2002 | Crupi et al. | 717/104 |
| 2004/0044987 A1 * | 3/2004 | Kompalli et al. | 717/100 |
| 2004/0205691 A1 * | 10/2004 | Poole et al. | 717/100 |
| 2004/0237066 A1 * | 11/2004 | Grundy et al. | 717/104 |
| 2005/0108684 A1 * | 5/2005 | Sohn et al. | 717/120 |
| 2006/0248502 A1 * | 11/2006 | Sueur et al. | 717/101 |
| 2007/0168929 A1 * | 7/2007 | Larvet et al. | 717/104 |
| 2010/0037202 A1 * | 2/2010 | Schubert | 717/105 |
| 2010/0037213 A1 * | 2/2010 | Meijer et al. | 717/144 |
| 2010/0198844 A1 * | 8/2010 | Ribbe et al. | 707/755 |
| 2010/0269089 A1 * | 10/2010 | Panicker et al. | 717/105 |
| 2012/0324432 A1 * | 12/2012 | Mizrachi et al. | 717/162 |

OTHER PUBLICATIONS

Brabrand et al., "PowerForms: Declarative client-side form field validation," 2000, World Wide Web, vol. 3, Issue 4, pp. 205-214.*

(Continued)

*Primary Examiner* — Thuy Dao
*Assistant Examiner* — Stephen Berman
(74) *Attorney, Agent, or Firm* — Meyer IP Law Group

(57) ABSTRACT

A system and method can support design pattern automation. A design environment, such as a design pattern automation platform, enables the definition of design patterns including the model entities and their relationships. The design pattern automation platform leverages the definitions and user input, and uses an intelligent method to automate the implementation of arbitrarily complex software design artifacts that realize the design patterns. The design pattern automation platform allows a user to specify a design pattern model that describes a design pattern. A user interface (UI) framework can consume the design pattern model and can render a set of UI pages that allow for user interaction with the design pattern. Furthermore, a pattern processor can combine the metamodel with user inputs from the UI framework and produce a set of entities or resources for the design pattern.

20 Claims, 8 Drawing Sheets

(56) References Cited

OTHER PUBLICATIONS

Wikipedia, "Software Development Kit," 2010, pp. 1-3, downloaded on May 8, 2014 from <url>: http://web.archive.org/web/20100303120855/http://en.wikipedia.org/wiki/Software_development_kit.*

Albin-Amiot et al., "Meta-modeling Design Patterns: application to pattern detection and code synthesis," 2001, ECOOP 2001 workshop on Adaptative Objet-Models and Metamodeling Techniques, pp. 1-8.*

Lara et al., "AToM: A Tool for Multi-formalism and Meta-modelling," 2002, Fundamental Approaches to Software Engineering Lecture Notes in Computer Sciencevol. 2306, 2002, pp. 174-188.*

Albin-Amiot et al., "Instantiating and detecting design patterns: putting bits and pieces together," 2001, Proceedings. 16th Annual International Conference on Automated Software Engineering, 2001. (ASE 2001), pp. 166-173.*

\* cited by examiner

SYSTEM AND METHOD FOR SUPPORTING INTELLIGENT DESIGN PATTERN AUTOMATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software, and is particularly related to supporting design pattern automation.

BACKGROUND

In response to the ever-increasing demand for rapid solution design, telecommunications software vendors have introduced highly customizable products. Thus, many of the contemporary products are model driven and include post-market design capabilities. As a result, customers can develop their solutions using the flexible but complex design environments and techniques offered by software vendors.

High solution development cost is one of the consequences of the complexity of today's software design environments. Product vendors attempt to reduce this cost by introducing ad-hoc pre-coded optimizations in their product specific design environments. However, this method is expensive and has a long lead time that is required for the delivery of new product releases. Thus, the pre-coding of design patterns is only cost effective for the most frequently used solution design patterns. For the vast majority of the post-market solution design patterns and techniques, vendors and customers alike, leverage guidelines and best practices to train their solution designers, while the coding of the design pattern remains a manual process. This approach is highly laborious, error prone and expensive.

This is the general area that embodiments of the invention are intended to address.

SUMMARY

Described herein are systems and methods that can support design pattern automation. A design environment, such as a design pattern automation platform, enables the definition of design patterns including the model entities and their relationships. The design pattern automation platform leverages the definitions and user input, and uses an intelligent method to automate the implementation of arbitrarily complex software design artifacts that realize the design patterns. The design pattern automation platform allows a user to specify a design pattern model that describes a design pattern. A user interface (UI) framework can consume the design pattern model and can render a set of UI pages that allow for user interaction with the design pattern. Furthermore, a pattern processor can combine the meta-model with user inputs from the UI framework and produce a set of entities or resources for the design pattern.

DETAILED DESCRIPTION

Described herein are systems and methods that can support intelligent design pattern automation.

Figure 1:
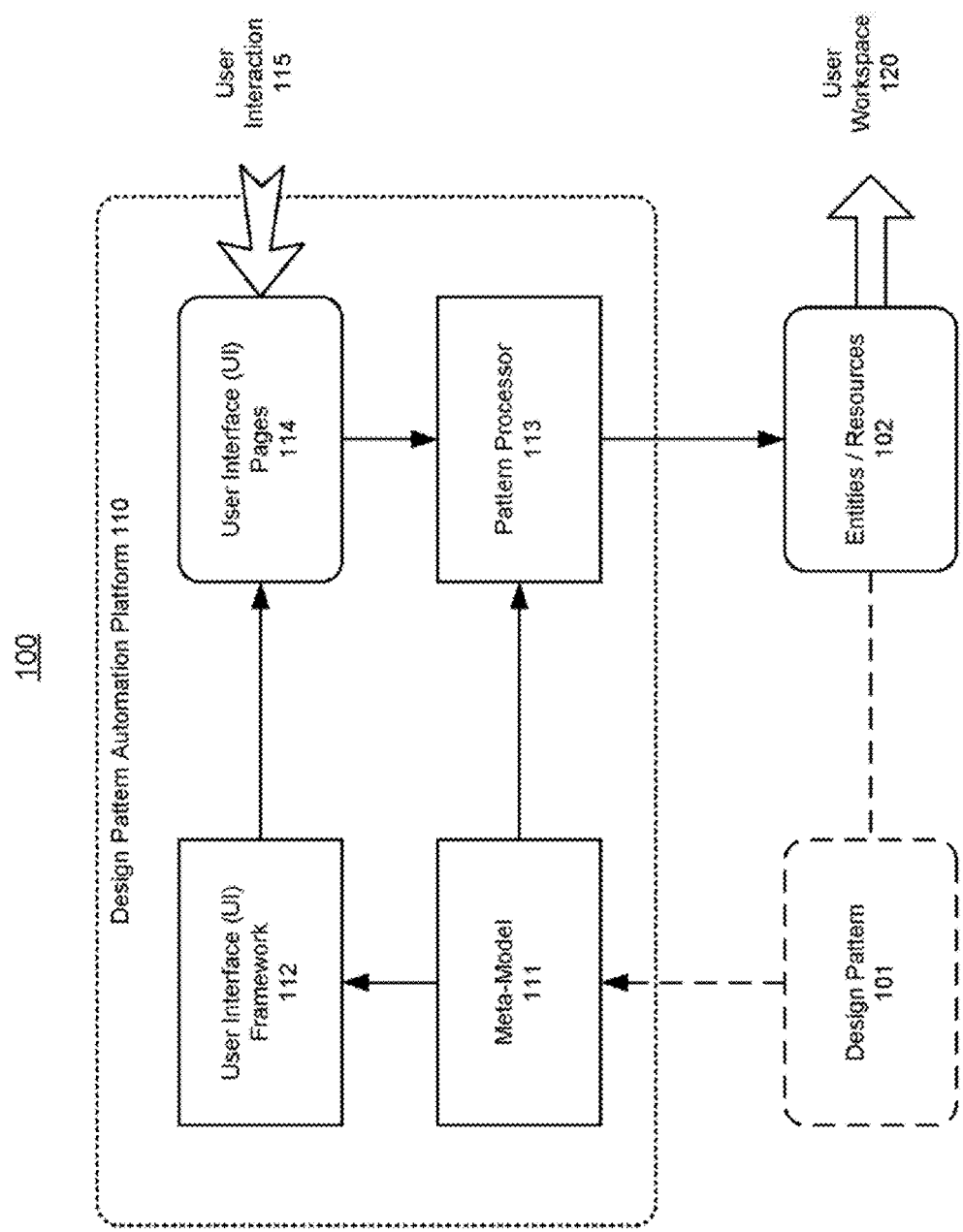
FIG. 1 shows an illustration of supporting intelligent design pattern automation in accordance with various embodiments of the invention.

FIG. 1 shows an illustration of supporting intelligent design pattern automation in accordance with various embodiments of the invention. As shown in FIG. 1, a design environment, such as a design pattern automation platform 110, can support a design pattern 101 in an application development environment 100.

The design pattern 101 can be a template containing a self describing set of resources that are applied to an application development workspace 120, such as the Design Studio workspace. The design pattern 101 can be used to deliver different sets of pre-configured artifacts that serve various domain specific functions, e.g. a library to perform higher level tasks such as creating a virtual private network (VPN) or adding a site to a VPN.

The resources 102, which can be preconfigured to perform the higher level task, can include design environment entities, e.g. Design Studio Model Entities, and integration code and scripts. Furthermore, the design pattern 101 can be specified using a declarative language, such as a templating language, which allows the design pattern 101 to be customized when applied with user supplied information.

The design pattern automation platform 110 can include several components, e.g. a design pattern model 111, a dynamic user interface (UI) framework 112, and a pattern processor 113.

The design pattern model 111, such as a meta-model, can describe the design pattern 101. The design pattern model 111 can specify a list of resources or entities 102 that are required to realize the design pattern 101, and the topology or layout of the entities that is required upon the successful execution of the design pattern 101.

Additionally, the design pattern model 111 can include a list of tokens, which define the specific data that must be captured from the user (or populated with default values). These tokens represent the specific points in the entity configurations that may potentially differ from one execution of the design pattern model 111 to another. These tokens may also provide UI hints which can help the framework properly render components as part of an interrogation phase including documentation, data validation and type checking. Furthermore, the design pattern model 111 can include global UI hints, such as token groups, that can help to provide relevant logical grouping of tokens.

The dynamic UI framework 112 can consume the design pattern model 111 and render a set of UI pages 114, e.g. web pages, which allow for user interaction 115 with the pattern. These UI pages 114 can be in the form of a set of wizard pages or entire editors. This UI framework 112 can take advantage of the UI hints described in the token model to properly render appropriate UI components with a usable layout.

The pattern processor 113 can combine the design pattern model 111 with the inputs from the dynamic UI 112 and produce a set of entities or resources 102, in which the user inputs are merged into the appropriate locations in order to produce the required configurations. Furthermore, the pattern processor 113 can lay out the modified entities or resources according to the topology defined in the design pattern model 111.

Working in conjunction, these components allows a design pattern developer to define the entities and their relationships as well as any additional user inputs required to properly realize the design pattern.

Additionally, the creation of the design pattern 101 may not be limited to the product development team. By using a declarative language that is directly interpreted by the design environment, end users can quickly and easily create and maintain their own design patterns without recurring to the software vendor's assistance.

This design pattern automation platform 110 can automate the solution design by making design decisions and generating artifacts (model entities and relationships) based on multiple environmental factors, thereby accelerating the overall implementation. This platform 110 can reduce the occurrence of coding defects by eliminating the human error from possibly large portions of the solution design.

The design patterns automation platform 110 can be based on the Eclipse platform. For example, the design pattern automation logic can be contained in Eclipse Plug-in projects and packaged as Features projects. One Eclipse Features project can contain any number of Plug-in projects, each holding an arbitrary number of design patterns.

In accordance with various embodiments of the invention, the intelligent design pattern automation can be applicable to any model driven application that includes or relies on a design environment or that includes such functions for post-market customizations.

In the past, when trying to drive patterns into a design-time tool, there may be a requirement for specific editors or wizards that would be custom built to encapsulate the desired behaviors. This is usually expensive to implement and difficult to maintain. With intelligent design pattern automation, the creation of these wizards and editors can be done through a declarative interface that requires no additional code.

The design pattern automation platform 110 enables the post-market definition of design patterns using a declarative language. Once defined, these patterns can then be used repeatedly during the design of many solutions. When used, the pattern definitions produce a highly optimized user experience in the solution design environment while generating arbitrarily complex sets of model entities and relationships.

Above and beyond a template-based model generation, the design pattern automation platform 110 can make decisions based on user input, on the context where it is applied and on the current state of the solution design. The design pattern automation platform 110 enables users to rapidly define new patterns and hence does not suffer from the lead time inherent to product releases.

The intelligent design pattern automation simplifies the solution design experience by providing an optimized user experience where only the essential user input and decision are requested, while the pattern logic and implementation details are executed intelligently and automatically by the system. For example, the design pattern automation platform 110 can eliminate many hours of coding and replace them with a simple graphical user interface (GUI) interaction.

By defining and distributing a common set of design patterns to all the developers, the solution teams can improve consistency and assure compliance with the development guidelines and best practices.

Figure 2:
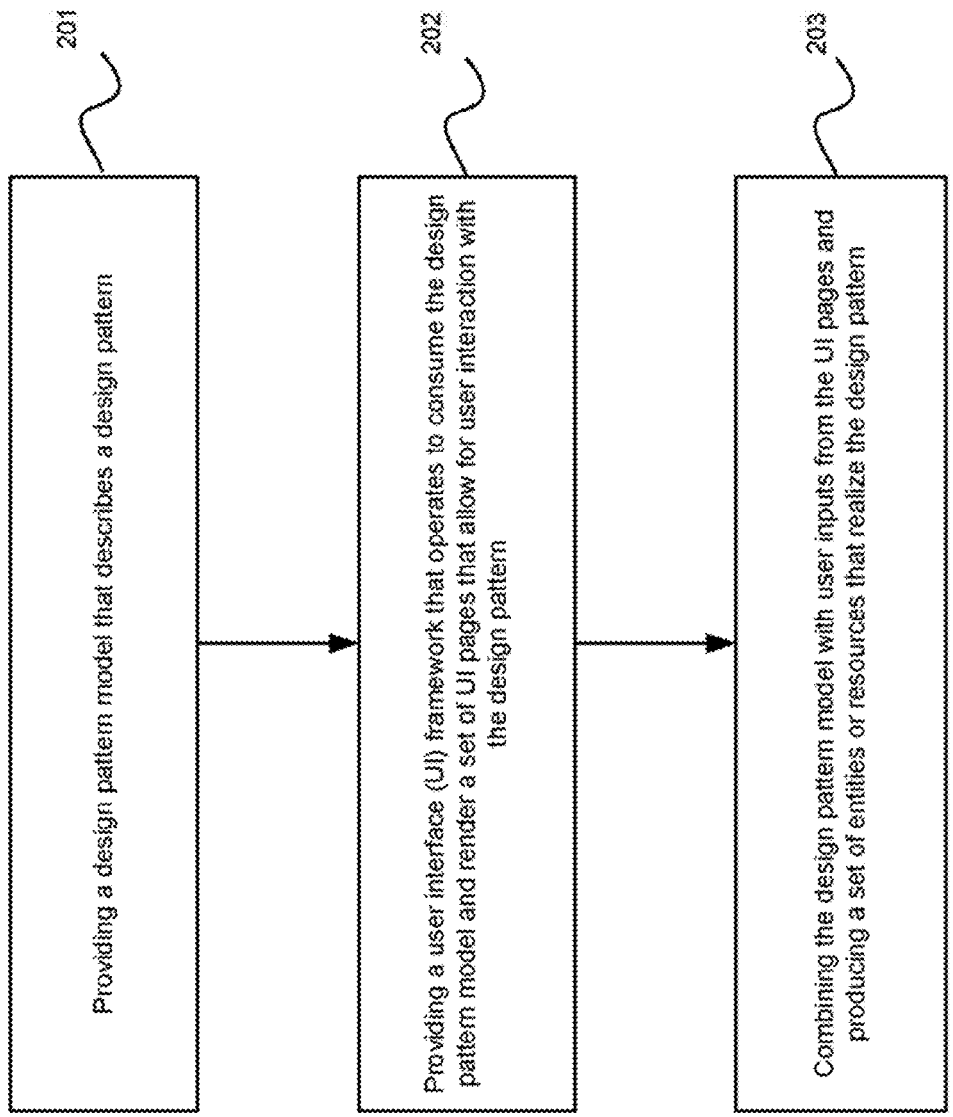
FIG. 2 illustrates an exemplary flow chart for supporting intelligent design pattern automation in accordance with an embodiment of the invention.

Thus, the intelligent design pattern automation enables productivity improvements in solution development by allowing software vendors (such as communications software vendors), system integrators and their customers (such as communications service providers) to define and distribute, and to consistently apply efficient design patterns to their solutions. The business benefits are discussed in detail below:

FIG. 2 illustrates an exemplary flow chart for supporting intelligent design pattern automation in accordance with an embodiment of the invention. As shown in FIG. 2, at step 201, a design environment can provide a design pattern model that describes a design pattern. Then, at step 202, the design environment can provide a user interface (UI) framework that operates to consume the design pattern model and render a set of UI pages that allow for user interaction with the design pattern. Furthermore, at step 203, a pattern processor can combine the design pattern model with user inputs from the UI pages and can produce a set of entities and/or resources that realize the design pattern.

Design Pattern Model

Figure 3:
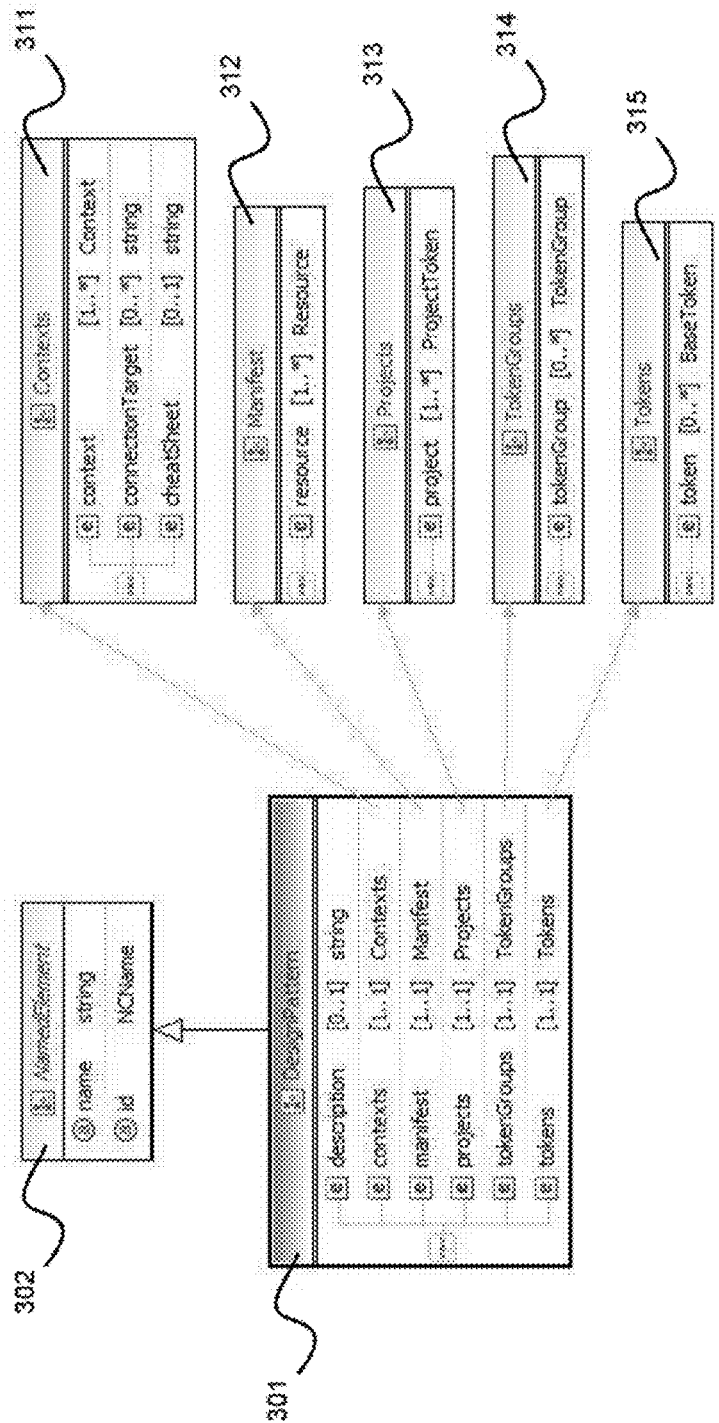
FIG. 3 shows an illustration of a design pattern model in accordance with various embodiments of the invention.

FIG. 3 shows an illustration of a design pattern model in accordance with various embodiments of the invention. As shown in FIG. 3, the design pattern 301 can include various sections, e.g. contexts 311, manifest 312, projects 313, token groups 314 and tokens 315.

The contexts 311 can describe where in the design environment user interface the design pattern is accessible. Multiple contexts can be created for a design pattern so that the design pattern can be triggered from multiple areas within the design environment.

The manifest 312 section can describe the resources, e.g. in a list, which can be added to a workspace when the design pattern 301 is applied. For example, any type of resource (file) that can be put into an Eclipse Workspace for applying a design pattern 301 can be included in the manifest.

The projects 313 section can describe the types of projects, to which a design pattern 301 can apply resources. Each resource within the manifest 312 can be put into a design project within the user workspace. This can be a list of projects, to which resources can be configured to target.

The tokens 315 can describe the information that a user can customize in the resources referenced from the manifest 312 when the design pattern 301 is applied. This is the set of information that needs to be collected from the user before the design pattern 301 can be deployed. Tokens 315 can be embedded within the target locations of resources within the manifest, within text documents that will be copied to the workspace and within other tokens.

The tokens 315 can be of different types, such as: project, string, numeric, Boolean, enumeration, entity reference, and element reference. The project token represents the projects to which resources are copied when the pattern is applied. The string token represents textual input. The text accepted by the token can be constrained by configuring regular expressions. The numeric token represents numeric input. The Boolean token includes true and false values. The enumeration token includes a set of preconfigured choices. The entity reference token represents the name of a referable model entity (such as a Design Studio Model Entity) in a workspace. The element reference token represents an element, such as a Data Dictionary element, in a workspace. Additionally, more token types can be specified in the design pattern XML Schema, e.g. DesignPattern.xsd in the oracle.communications.sce.pattern.sdk.bundle archive file.

The token group 314 can describe the UI pages, such as the pages included in the Design Pattern wizard. When the wizard is running, it can collect the information defined as tokens 315 in the design pattern 301. The tokens 315 can be organized as pages within the Design Pattern wizard, with each page defined as a token group. Any number of token groups (pages) can be defined for the design pattern, with each token to be associated with one token group.

Additionally, the design pattern 301 can include description that can be used by the Design Pattern Wizard to collect information from the user. The description can be used on the opening page of the Design Pattern Wizard to describe that the function of a design pattern. Enough information can be provided to the user, so that the user can have a clear understanding of what domain functionality is added to their workspace.

Furthermore, the design pattern 301 can be associated with, e.g. extended from, a named element 302. The named element 302 can be a base type used by any component in a design pattern document that has both an ID for unique identification and a name for common usage. Since the named element 302 is an abstract type, only the extensions may be visible in the design pattern document.

The named element 302 can include a name attribute, which contains the common name of the element in the design Pattern document. This name may commonly be used within the Design Pattern Wizard to refer to a token or component within the Design Pattern. The named element 302 can include an ID attribute, which is a unique identifier of an element. The value for this field can be unique within the type of element in a document. For example, no two tokens should have the same ID. When references are made between elements within a design pattern, it is this ID that should be used to reference the element.

Context

In accordance with various embodiments of the invention, context can be used to determine the locations within the design environment user interface that a design pattern can be exposed. Additional context information can be provided to control the behavior of the design environment when the design pattern is executed.

A context can have different attributes, such as scope, ID, connection target, and cheat sheet.

The scope of the context describes where in the design environment a design pattern is accessible. The following list includes values for specifying the different areas in the design environment that the design patterns can be attached.

project—When design pattern is accessible from or attached to a project
  entity—When design pattern is accessible from or attached to an entity or entity folder
  folder—When design pattern is accessible from or attached to a folder Whenever the user initiates an action that focus on one of these areas, the system can evaluate whether any design patterns are available and present the option to apply these design patterns to the user.

The ID field of context can be used to further specify the scope of the context. For example, if the scope is set to entity then the ID field is used to specify the types of entities. If the scope is set to project then the ID field is used to specify the types of projects. The following scheme can be used to determine the ID field based on the scope type:

project—any value that reflects a type of project supported in the design environment (such as Design Studio), e.g. one of the following values: OSM, UIM, ACT, IPSA, NI, MODEL
  entity—the file extension used for that type of Design Studio model entity, for example an OSM Manual Task would use "manualTask".
  folder—the file extension for the entity type that holds the folder and the camel case (no white space) folder name with a "dot" separator. For example, the Fulfillment Plan folder under OSM Product Classes would use the token productClass.fulfillmentPlan.

A connection target can be used to determine which resource in the manifest can connect to the entity in focus after the Design Pattern Wizard finishes execution. The connection target of the context contains the ID of the resource to be connected. For example if the scope of a Design Pattern is an OSM Order entity and the connection target is a OSM process that is created by the wizard, then after the Design Pattern Wizard finishes it can attempt to create a reference between the OSM order that was selected to execute the Design Pattern from and the process created by the pattern.

A cheat sheet of context contains the resource ID of a cheat sheet in the manifest. The cheat sheet can be tokenized like other resources and can be copied into the user's workspace. The cheat sheet can be launched after the design pattern completes execution. The cheat sheet can be used to walk a user through any manual configuration that may still be needed after the design pattern completes, or to show the user specific resources that were created by the design pattern.

Resource

In accordance with various embodiments of the invention, a resource is a file that can be copied into the user's workspace when the design pattern is applied. A design pattern includes a list of files that can be copied into a user's workspace that are pre-configured to achieve various domain centric tasks. The design pattern can also include the instructions on how these files can be processed as they are copied.

The ID attribute of a resource contains a unique identifier of the resource. If references are made to the resource by other components of the design pattern, they can use the value of the ID field for the resource. The value of each ID field within the manifest can be unique.

The Overwrite Policy attribute of a resource controls what may happen if a resource with the same name and location (such as the targetLocation) already exists in the project that the resource is being copied to. For example, the following values can be supported:

ALWAYS—the existing file can be overwritten by the resource contained in the design pattern. If the resource in the workspace is read only, it may not be overwritten. This case can be noted in the log produced when the design pattern is applied.
  NEVER—the existing file may not be overwritten by the copy contained in the design pattern. Additionally no token substitutions may be performed on this document.
  CANCEL—the design pattern may not be applied.

Furthermore, if the attribute is not present, ALWAYS is assumed and the resource can be overwritten by the resource in the Design Pattern.

The location ID attribute of a resource contains the location of the resource within the design pattern archive that can be copied to the user's workspace. A fully qualified path may be expected starting at the root of the archive.

The target location attribute of a resource contains the location that the resource may be copied to in the user's workspace. If the field is not supplied, then the resource can be copied to the same project relative location that it has in the design pattern archive. Additionally, the targetLocation field can contain embedded tokens.

The Project ID is the ID of the project token that identifies which project this resource will be copied to. The Project ID resolves to one of the project token IDs within the projects collection.

Tokens

In accordance with various embodiments of the invention, a token is a piece of information that needs to be collected from a user at the time when a design pattern is applied.

Once the token is collected, the token can be used in several different ways. For example, the token can be used to change the location or name of a resource as it is copied into the workspace by embedding it in the targetLocation field of a resource. The token can be embedded in any text based document. Once the document is moved to the workspace, the system can perform a token replacement within the document contents. Additionally, the token can be embedded within other tokens by using it in the defaultValue field of the token. When this is the case, a Design Pattern Wizard may attempt to expand the default name when the token group is rendered. If a value for the token exists, then the expanded name will be displayed. If no token exists, then the system will display the tokenized form.

The syntax for embedding a token is the same in each context: @@tokenID@@. For example, the following syntax can be used for embedding a token called service in the targetLocation of a resource.

targetLocation="/src/oracle/communications/services/
   @@service@@/@@service@@Interface.java"

Additionally, when a value of "VOIP" is assigned to the service token, the above syntax can be expanded as shown in the following.

targetLocation="hrc/oracle/communications/services/
   VOIP/VOIPInterface.java"

A token can include a token group attribute that can be used to organize information displayed to the user in the Design Pattern Wizard. A token group is realized as a separate page within the wizard. The token group attribute determines which page this token will be displayed on. The expected value for the token group attribute is an ID from one of the token groups defined in the token group collection of the design pattern.

Furthermore, when a token is displayed to the user in the Design Pattern Wizard, a default value can be provided as the initial value that can be displayed to the user. The default value may embed other tokens. For example, a token, which is defined with an ID of baseInformation, can be embed in the defaultvalue attribute for a separate token., and a user can define a string token such as: "My New Default @@baseInformation@@ value". If the baseInformation token is given a value of "with Embedded Information", then the string token can be expanded to "My New Default with Embedded Information value".

Token expansion is performed in the order that the token are defined in the token collection. The designer of the design pattern can ensure that the required expansions take place in an order that can produce the desired results. Furthermore, default values can be optional, although it is a best practice.

The user can have the option of overriding default values by providing a value of their own.

A description can contain the information requested from the user. The description can be used in the Design Pattern Wizard to provide additional information or instructions to the user when they are providing token values.

Validation rules can be associated with the tokens. For example, a regular expression can be used to validate the token values entered by users in the Design Pattern Wizard. The field can have multiple sub fields, e.g. regular expression and message. This allows the user to write several simple expressions instead of one complex one and for the system to display a user friendly message for failed validation. Regular Expressions are optional and may not apply to all token types.

Creating a Design Pattern

Figure 4:
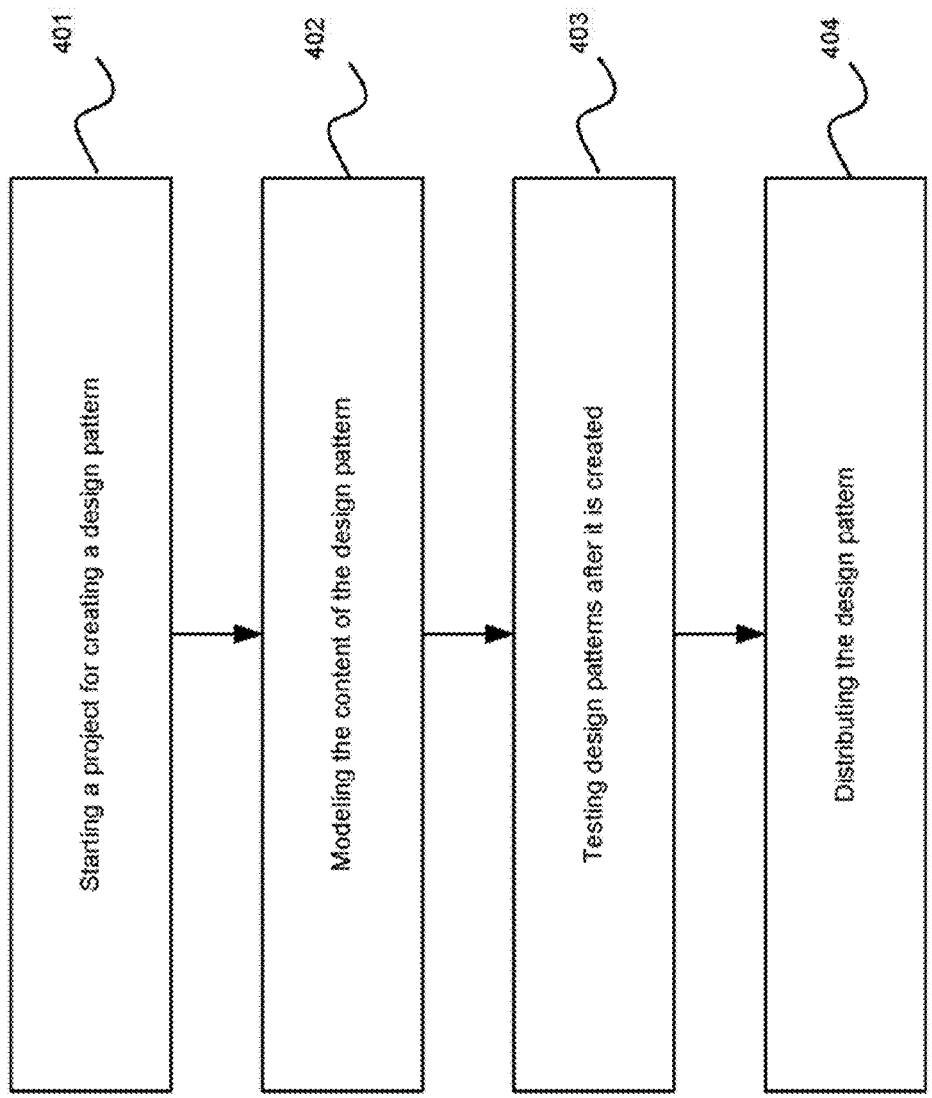
FIG. 4 shows an illustration of creating in a design pattern in accordance with various embodiments of the invention.

FIG. 4 shows an illustration of creating in a design pattern in accordance with various embodiments of the invention. A software development kit (SDK), e.g. Oracle Communications Design Studio Design Pattern SDK, can be provided to facilitate the creation of a design pattern. For example, the creation of a design pattern in a design environment can itself be captured as a design pattern.

At step 401, a user can start a project, e.g. a plug-in project, for creating a design pattern, and register the design pattern with a design environment, e.g. the Design Studio. The design environment allows a user to build a working example of the content that the user wishes to capture in the design pattern. Then, the user can harvest the content by copying the required resources to the location of the design pattern in the design pattern development project, such as a plug-in project.

The design environment can populate the project with artifacts necessary to build a design pattern. The information includes a manifest, a resource directory, and all related configurations for the packaging of the design pattern.

At step 402, a user can begin to model the content of the design pattern. The modeling of the design pattern content includes working with design pattern configuration data, design pattern resources, Tokens, and Cheat sheet.

The SDK can generate various configuration files, such as the pattern.xml, build.properties, and MANIFEST.MF files, for configuring the design patterns. These files can specify various dependencies to the packages that may be required for design pattern development. They can also include the registration and specific build properties that may be required to build and package a design pattern. Alternatively, a user can manually configure the design patterns by editing the configuration files.

Then, a user can add various resources into the design pattern. There are two steps for adding a resource to a design pattern in the Design Studio. The first step is to copy the resource to the location specified by a design pattern in the plugin.xml file. For example, if the location of the design pattern in the plugin.xml file is /pattern/myPattern, resources can be added to this directory or its sub directories. The second step is to add the resource to the pattern.xml document in the "manifest" section.

The information needed for configuring a resource includes an "Id" and a "location". The Id can be unique for each resource in the manifest. The location is the relative path of the resource from the location of the design pattern. For example, if the location of the design pattern is "/pattern/myPattern" and one of the resources for the pattern from the project root is "/pattern/myPattern/dictionary/pattern.xsd", then the location of the resource is "dictionary/pattern.xsd".

The tokens can be used in different ways. For example, the tokens can be used to change the name or location of a resource when it is copied into a project by embedding the token in the targetLocation field of the resource. The tokens can be used in the defaultValue field of other tokens to provide intelligent defaults based on previously collected information. The tokens can be embedded in text documents to customize the content of a file.

For example, a user can define a token called equipmentName and use it to give a name to an equipment specification in a design pattern. The user can define the targetLocation field for the specification as:

<targetLocation>model/equipment/
@@equipmentName@@.equipment</targetLocation>

If a value of opticalDevice is given for the equipmentName token when the pattern is applied, the targetLocation value can expand as the following:

model/equipment/opticalDevice.equipment

Tokens can also be defined in other locations of the path in the targetLocation. For example, the user can define a token named deviceVendor and use it to expand the previous example:

<targetLocation>model/equipment/@@equipmentVendor@@/
@@equipmentName@@.equipment</targetLocation>

If a value oracle was supplied for the deviceVendor token, the targetLocation value in this example expands to:

model/equipment/oracle/opticalDevice.equipment

The design pattern can automatically create directories as needed when copying resources into a workspace.

Furthermore, tokens can be embedded in the default values of other tokens. For example, a user can define a token called deviceGateway and define it with the following default value:

<defaultValue>@@equipmentName@@_gateway</defaultValue>

Using the same value of opticalDevice supplied for the equipmentType token the default value in this example expands to:

opticalDevice_gateway

It is beneficial to ensure that all tokens are properly replaced when the pattern is applied and that the input is adequately restricted. For example, when using embedded tokens as default values for other tokens, the embedded token is ensured to appear in an earlier token group than where it is used. If a value has not been assigned before the token is displayed to a user, the embedded token will be displayed as the defaultValue field.

Additionally, when using a String token, validation rules can be associated to validate the input, since some character-based input is not valid for use in a token definition. For example, if a user uses a token as a file name then it may contain only characters that are valid for file name use. If the user embeds a token in a Design Studio Model Entity or in an XML document, the use of XML special characters is restricted. The user may employ a restrictive policy when defining validation rules to avoid invalid file names and corrupted XML files.

Element reference tokens can return a snippet of XML, as shown in the following, instead of a simple value. The element reference tokens can be embedded in a Design Studio model entity document for replacing a reference to an element.

<com:entity>--from selection--</com:entity>
<com:entityType>--from selection--</com:entityType>
<com:relationship>--from token configuration--</com:relationship>

<com:element>--from selection--</com:element>
<com:elementType>--from token configuration--</com:elementType>

For example, the token can be used to replace a section of XML within a Design Studio Model Entity document with the corresponding structure.

Furthermore, cheat sheets can be XML documents that can be interpreted, e.g. by the Eclipse Cheat Sheet framework, to provide user assistance. Cheat sheets are not mandatory for design patterns, but are recommended. A user can use cheat sheets to describe the resources added to a workspace, and to assist users with any manual steps required after a design pattern is applied. The user can edit cheat sheets using any XML editor. For example, Eclipse provides a specific Cheat Sheet editor that facilitates cheat sheet development.

At step 403, a user can test design patterns after it is created. In one example, the user can test design patterns using the Design Pattern Wizard.

At step 404, a user can distribute design patterns, which may be developed using plug-in projects. The plug-in projects can be grouped into features, and features can be made available to users through update sites. For example, to distribute design patterns based on Eclipse, a user can first create a Feature project using the Feature Project Creation Wizard. Then, the user can add the plug-in project to the Feature project, and create an update site using the Update Site Project Creation Wizard. Finally, the user can add customized feature to the site map for the update site, build the update site, and make it available to the end users.

Additionally, a user can secure design pattern information. Design patterns may not have security protection for the information they include, since different users can apply the same design patterns. Thus, it is a good practice to not include sensitive information in the design patterns. If sensitive information is needed to complete the configuration of a design pattern, one option is to include a cheat sheet, which runs after the design pattern is applied, to manually configure the sensitive information.

Applying a Design Pattern

Figure 5:
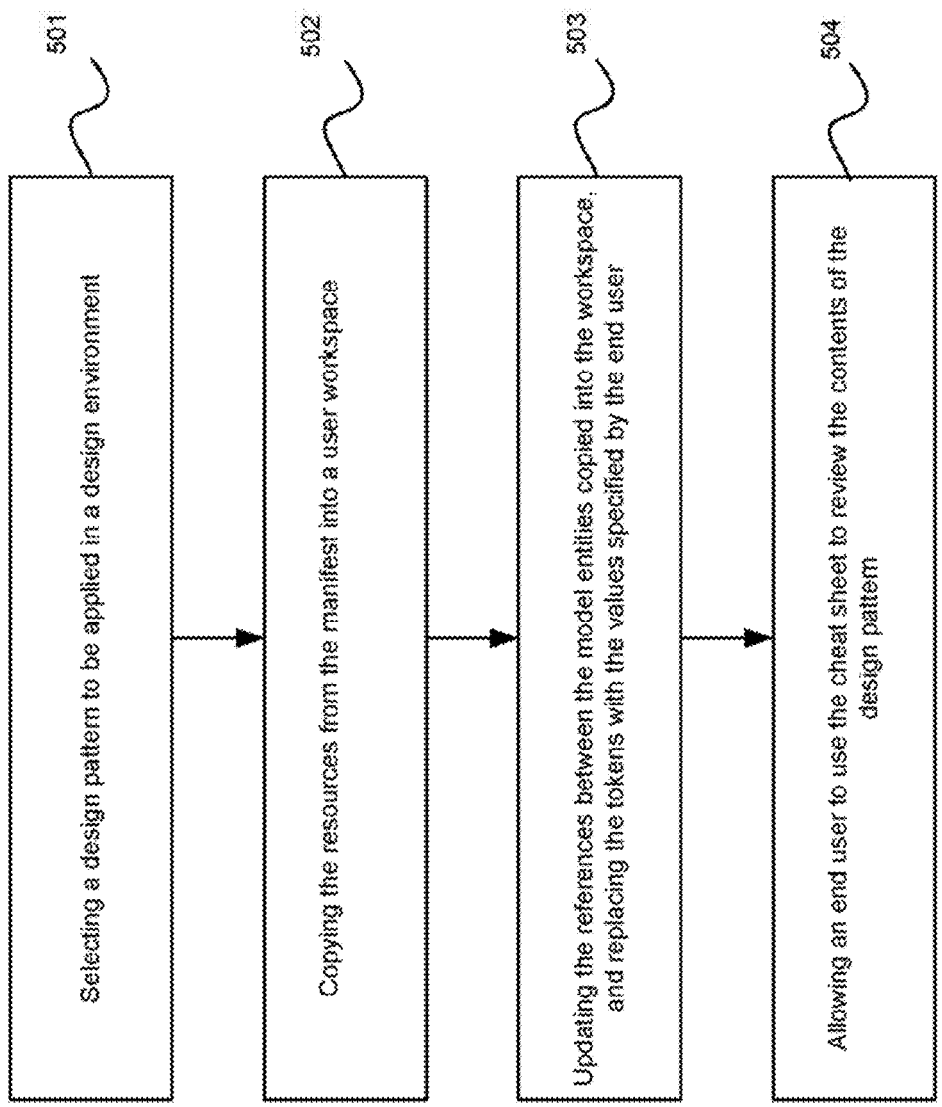
FIG. 5 shows an illustration of applying a design pattern in a design environment, in accordance with various embodiments of the invention.

FIG. 5 shows an illustration of applying a design pattern in a design environment, in accordance with various embodiments of the invention.

At step 501, an end user can apply design patterns by accessing the dynamically generated UI pages in a design environment, such as the Design Pattern Wizard in the Design Studio. The end user can select a design pattern from a Design Studio menu. Then, the end user is allowed to enter information through the Design Pattern Wizard. The Design Pattern Wizard can prompt the end user for all information (the tokens) required for applying the design pattern.

At step 502, the design environment can copy the resources from the manifest into a user workspace after the Design Pattern Wizard collects the required information. A resources folder can be given a target location in the manifest, and the resources are copied into that location using the name specified by the user in the wizard.

At step 503, the design environment updates the references between the Design Studio Model Entities copied into the workspace, based on the names defined in the manifest. Then, the design environment can locate any tokens embedded in text documents in the manifest (Design Studio Model Entities, XML, XSLT, XQuery, Java, and so forth) and replaces them with the values that the user specified, e.g. in the Design Pattern Wizard.

At step 504, optionally, the end user is allowed to use the cheat sheet to review the contents of the design pattern, or to complete any remaining manual steps, e.g. in the Help view. The Design Studio may launch an Eclipse cheat sheet after the Design Pattern is applied, if a cheat sheet is included in the design pattern. After the design pattern is applied, the associated cheat sheet is integrated with the set of cheat sheets pre-existent in the design environment. The user can modify the configuration to meet any specific requirements.

An Orchestration Cartridge Example

Figure 6:
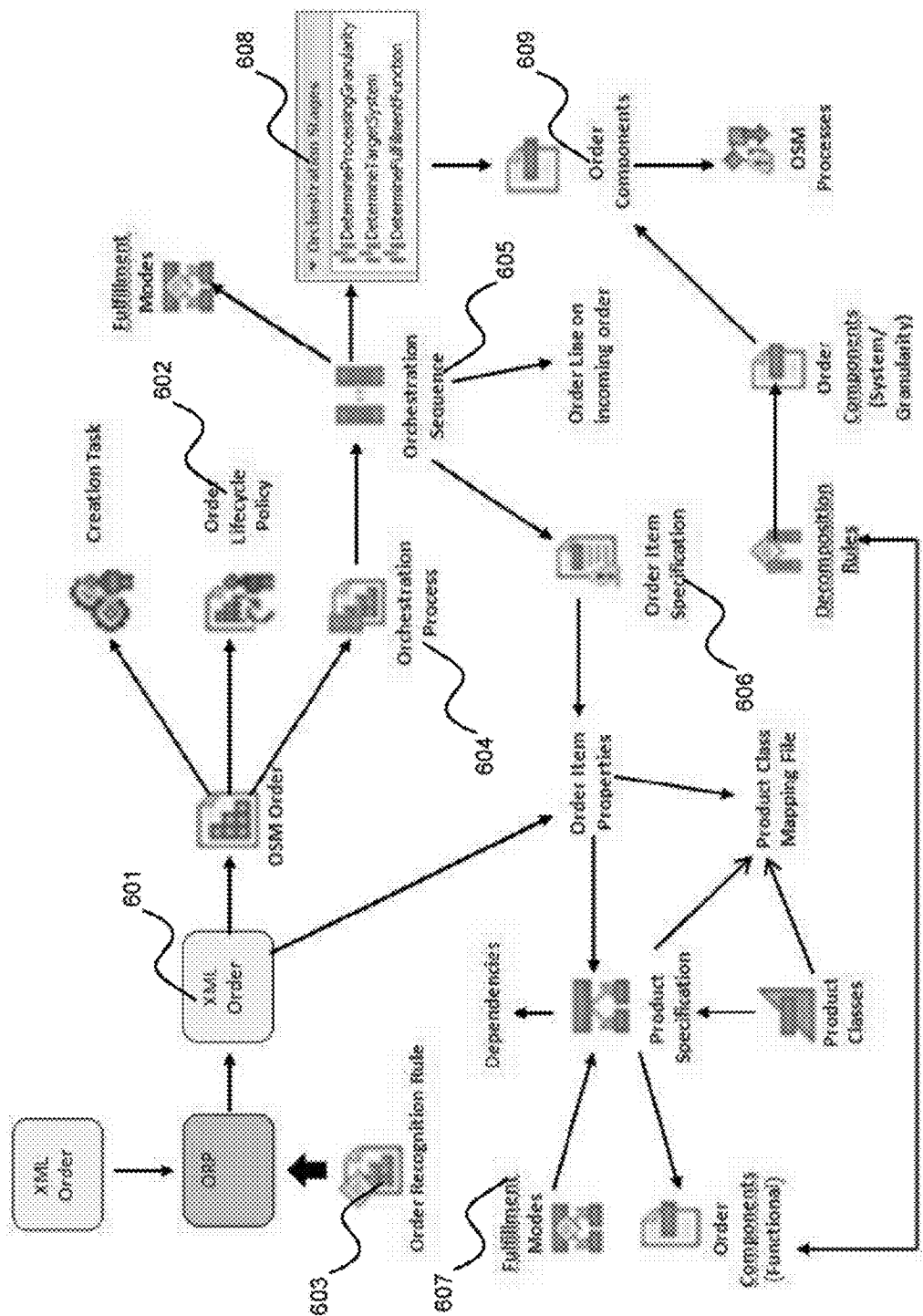
FIG. 6 shows an illustration of various entities and their relationship in an orchestration cartridge design pattern, in accordance with various embodiments of the invention.

FIG. 6 shows an illustration of various entities and their relationship in an orchestration cartridge design pattern, in accordance with various embodiments of the invention.

As shown in FIG. 6, a user can make use of design pattern feature provided by the design environment, e.g. the Design Studio platform, and can provide a mechanism for generating the boilerplate configuration required for an Orchestration Cartridge. Since this design pattern creates all the basic entities required for an Orchestration Cartridge, the best time to apply this design pattern is when the workspace is empty or on newly created project.

The automation platform in the design environment can create various entities after applying the Orchestration Cartridge design pattern. These entities include: Data schema (Data dictionary), Order 601, Manual Task (Used as creation task for the order created), Order Lifecycle Policy 602 (Used as Lifecycle Policy for the Order created), Role (Assigned to Order, Task and Lifecycle Policy created), Recognition rule 603, Orchestration Process 604, Orchestration Sequence 605, Order item specification 606, and Fulfillment modes 607. Additionally, the automation platform can generate several Orchestration stages 608, several Order Components 609, several folders in resources directory, and XQuery files in the respective directories and an XML catalog with name catalog.xml in xmlCatalogs\core directory.

Figure 7:
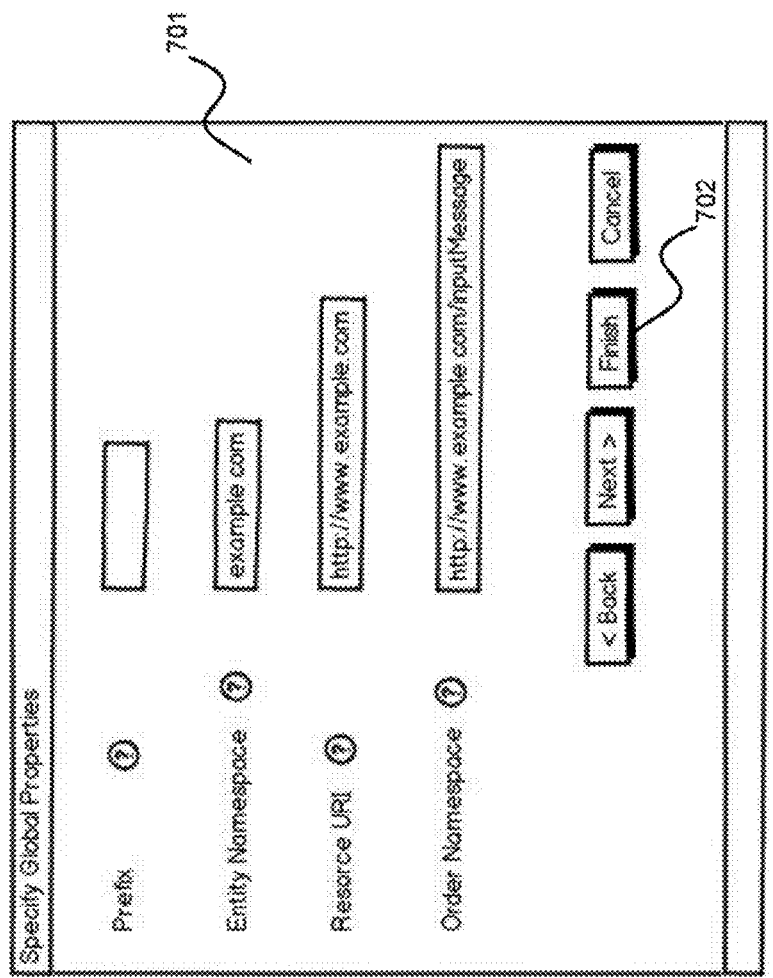
FIG. 7 shows an illustration of a dynamically generated user interface (UI) for inputting global properties selection, in accordance with various embodiments of the invention.
Figure 8:
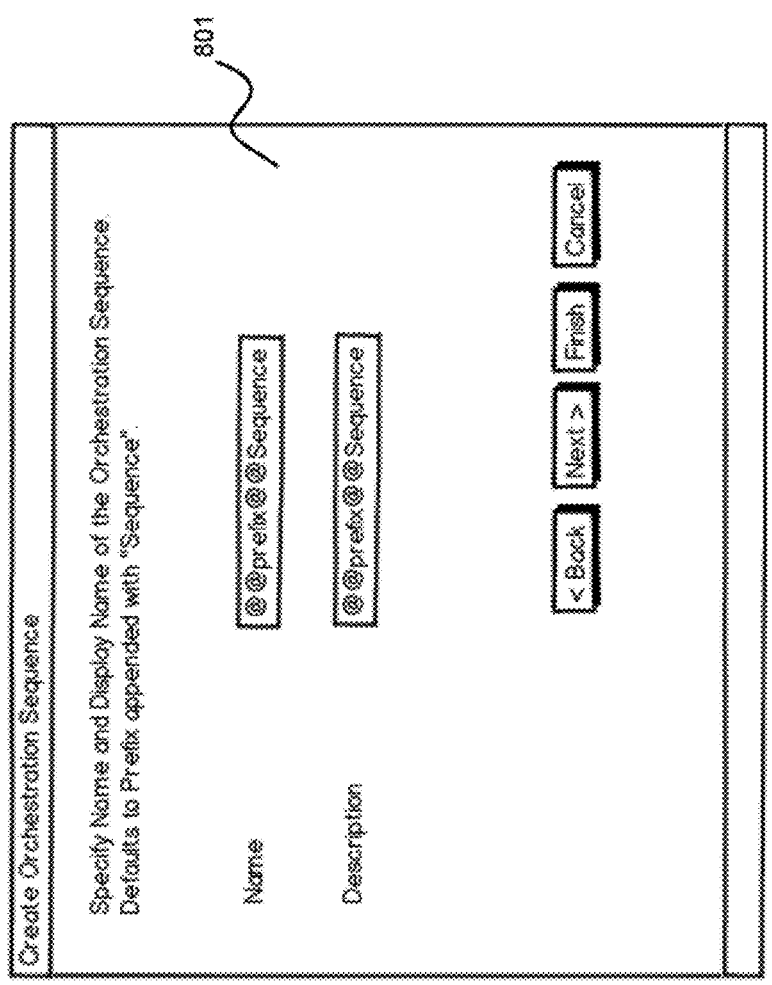
FIG. 8 shows an illustration of a dynamically generated user interface (UI) for creating an orchestration sequence entity, in accordance with various embodiments of the invention.

FIG. 7 and FIG. 8 are exemplary user interfaces (UIs) that are dynamically generated for creating entities after applying the Orchestration Cartridge design pattern. Other entities can be created without limitation, using user interfaces (UIs) dynamically generated in a similar fashion.

FIG. 7 shows an illustration of a dynamically generated user interface (UI) for inputting global properties selection, in accordance with various embodiments of the invention. As shown in FIG. 7, in the Global Properties Selection page 701, attributes required to generate the entities can be captured. A user can apply the selected design pattern by clicking the Finish button 702. If any customization is required in the further steps, the user can click on Next Button to proceed to next steps.

FIG. 8 shows an illustration of a dynamically generated user interface (UI) for creating an orchestration sequence entity, in accordance with various embodiments of the invention. As shown in FIG. 8, the name and description of the Orchestration Sequence entity can be captured using a Create Orchestration Sequence page 801. If an Orchestration Sequence entity with given name exists, it can be replaced by the one created by the design pattern when the overwritePolicy is set to be ALWAYS.

Additionally, the design environments can create the folders to hold XQueries, XQuery files, and entry in XML Catalog. For example, the environment can create a folder with name "OrchestrationSequence" in <<project path>>/resources directory of the project. Then, the environment can create XQuery files OrderItemSelector.xquery and FulfillmentModeExpression.xquery in <<project path>>/resources/OrchestrationSequence directory.

An example of the contents of OrderItemSelector.xquery is shown below.

```
(: Identifies order items from incoming order :)
(: Declare OSM Namespace :)
declare namespace
osm="http://xmlns.oracle.com/communications/ordermanagement/model";
(: Declare incoming order Namespace:)
declare namespace fulfillord="@@OrderNameSpace@@ ";
(: For example if incoming order items are contained in < salesOrderLine >
tag :)
(: XQuery might look like: :)
(: .// fulfillord:salesOrderLine :)
(: TO DO: Write XQuery to identify line items from incoming order items:)
```

Also, an example of the contents of FulfillmentModeExpression.xquery is shown below.

```
(: returns Fulfillment mode expression :)
(: Declare OSM Namespace :)
declare namespace
osm="http://xmlns.oracle.com/communications/ordermanagement/model";
(: Declare incoming order Namespace:)
declare namespace fulfillord="@@OrderNameSpace@@";
(: Replace @@ffMode1Name@@ with @@ffMode2Name@@ when
relevant. :)
(: Returns delivery mode "@@ffMode1Name@@" and Namespace
"@@EntityNameSpace@@" :)
declare variable $SALESORDER_FULFILLMENT_MODE :=
"@@ffMode1Name@@";
declare variable $SALESORDER_FULFILLMENT_NS :=
"@@EntityNameSpace@@";
let $fulfillmentModeCode := <osm:fulfillmentMode
name="{$SALESORDER_FULFILLMENT_MODE}"
namespace="{$SALESORDER_FULFILLMENT_NS"/>
return $fulfillmentModeCode
```

Additionally, the environment can create the following entry in XML catalog.

```
<rewriteURI uriStartString="@@Resource URI @@/
orchestration_sequence"
rewriePrefix="osmmodel:///@@Project Name@@/1.0.0.0.0/resources/
OrchestrationSequence"/>
```

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting design pattern automation, comprising:
 one or more microprocessors;
 a design pattern meta-model that describes a design pattern based on a declarative language, wherein the design pattern meta-model is configured to:
  provide a declarative interface which allows for definition of a design pattern,
  receive a working example of a pre-existing software project from which to develop the design pattern,
  populate the design pattern with design pattern artifacts and design pattern resources, and
  generate design pattern configuration files for the design pattern,
  whereby the design pattern meta-model allows creation of the design pattern through the declarative interface;
 wherein the design pattern meta-model comprises at least two sections selected from, a contexts section that describes where in a design environment user interface the design pattern is accessible, a manifest section that describes one or more resources added to a workspace when the design pattern is applied, a projects section that describes the project types where the design pattern can apply resources, a token groups section that describes the UI pages, and a tokens section that describes information that a user can provide for resource customization when the design pattern is applied;
 a user interface (UI) framework that operates to consume the design pattern meta-model and render a set of UI pages that allow for user interaction with the design pattern meta-model during creation of the design pattern;
 a pattern processor, running on the one or more microprocessors, that operates to combine the design pattern meta-model with user inputs from the set of UI pages and produce a set of entities and/or resources that generate the design pattern;
 wherein the UI framework subsequently operates to consume the design pattern and render another set of UI pages that allow for user interaction with the design pattern created using the design pattern meta-model; and
 wherein the pattern processor subsequently operates to combine the design pattern with user inputs from the another set of UI pages and produce another set of entities and/or resources that utilize the design pattern to generate a new software project based on the design pattern created using the design pattern meta-model from the pre-existing software project.

2. The system according to claim 1, wherein:
 said another set of entities and/or resources includes a plurality of files which are copied into a user workspace by the pattern processor and wherein the design pattern includes instructions identifying how the plurality of files are processed when they are copied.

3. The system according to claim 1, wherein the design pattern describes all of:

a list of resources or entities that are required to generate the new software project;
 a topology or layout of the entities that is required upon a successful execution of the design pattern;
 a list of tokens that specifies data that needs to be captured from the user; and
 one or more UI hints that provide logical grouping of the tokens.

4. The system according to claim 1, wherein the design pattern meta-model includes all of:
 a contexts section that describe where in a design environment user interface the design pattern is accessible;
 a manifest section that describes one or more resources added to a workspace when the design pattern is applied;
 a projects section that describes the project types where the design pattern can apply resources;
 a token groups section that describes the UI pages; and
 a tokens section that describes information that a user can provide for resource customization when the design pattern is applied.

5. The system according to claim 1, wherein:
 the design pattern uses one or more embedded tokens to collect information from a user when a design pattern is applied.

6. The system according to claim 1, wherein:
 the design pattern model allows for declarative definition of validation rules that can be executed against the user input.

7. The system according to claim 1, wherein:
 the user interface UI pages are in the form of a set of wizard pages, and the UI framework operates to render appropriate UI components with a usable layout based on one or more UI hints.

8. The system according to claim 7, wherein:
 each UI page corresponds to a token group.

9. The system according to claim 1, wherein:
 the pattern processor produces the another set of entities or resources, in which the user inputs are merged into appropriate locations, and the pattern processor operates to lay out modified entities or resources according to a topology defined in the design pattern.

10. A method for supporting design pattern automation, comprising:
 providing a design pattern meta-model that describes a design pattern based on a declarative language, wherein the design pattern meta-model is configured to provide a declarative interface which allows for definition of a design pattern, receive a working example of a pre-existing software project from which to develop the design pattern, populate the design pattern with design pattern artifacts and design pattern resources, and generate design pattern configuration files for the design pattern, whereby the design pattern meta-model allows creation of the design pattern through the declarative interface, and wherein the design pattern meta-model comprises at least two sections selected from, a contexts section that describes where in a design environment user interface the design pattern is accessible, a manifest section that describes one or more resources added to a workspace when the design pattern is applied, a projects section that describes the project types where the design pattern can apply resources, a token groups section that describes the UI pages, and a tokens section that describes information that a user can provide for resource customization when the design pattern is applied;

providing a user interface (UI) framework that operates to consume the design pattern meta-model and render a set of UI pages that allow for user interaction with the design pattern meta-model during creation of the design pattern;

combining, via a pattern processor running on one or more microprocessors, the design pattern meta-model with user inputs from the set of UI pages and producing a set of entities and/or resources that generate the design pattern;

wherein the UI framework subsequently operates to consume the design pattern and render another set of UI pages that allow for user interaction with the design pattern created using the design pattern meta-model; and wherein the pattern processor subsequently operates to combine the design pattern with user inputs from the another set of UI pages and produce another set of entities and/or resources that utilize the design pattern to generate a new software project based on the design pattern created using the design pattern meta-model from the pre-existing software project.

11. The method according to claim 10, wherein said another set of entities and/or resources include a plurality of files which are copied into a user workspace by the pattern processor and wherein the design pattern includes instructions identifying how the plurality of files are processed when they are copied.

12. The method according to claim 11, further comprising using the design pattern meta-model to describe:
   a list of resources or entities that are required to generate the design pattern;
   a topology or layout of the entities that is required upon a successful generation of the design pattern;
   a list of tokens that specifies data that needs to be captured from the user; and
   one or more UI hints that provide logical grouping of the tokens.

13. The method according to claim 10, further comprising configuring the design pattern meta-model to include all of:
   a contexts section that describe where in a design environment user interface the design pattern is accessible;
   a manifest section that describes one or more resources added to a workspace when the design pattern is applied;
   a projects section that describes the project types where the design pattern can apply resources;
   a token groups section that describes the UI pages; and
   a tokens section that describes information that a user can provide for resource customization when the design pattern is applied.

14. The method according to claim 10, further comprising:
   configuring the design pattern to use one or more embedded tokens to collect information from a user when a design pattern is applied.

15. The method according to claim 10, further comprising:
   configuring the design pattern to allow for declarative definition of validation rules that can be executed against the user input.

16. The method according to claim 10, further comprising:
   configuring the UI pages to be in the form of a set of wizard pages, and allowing the UI framework to render appropriate UI components with a usable layout based on one or more UI hints.

17. The method according to claim 16, further comprising:
   configuring each UI page to correspond to a token group.

18. The method according to claim 10, further comprising:
   allowing the pattern processor to produce the set of entities or resources, in which the user inputs are merged into appropriate locations, and allowing the pattern processor to lay out modified entities or resources according to a topology defined in the design pattern.

19. A non-transitory machine readable storage medium having instructions stored thereon for supporting design pattern automation, which instruction when executed, cause a system to perform steps comprising:
   providing a design pattern meta-model that describes a design pattern based on a declarative language, wherein the design pattern meta-model is configured to provide a declarative interface which allows for definition of a design pattern, receive a working example of a pre-existing software project from which to develop the design pattern, populate the design pattern with design pattern artifacts and design pattern resources, and generate design pattern configuration files for the design pattern, whereby the design pattern meta-model allows creation of the design pattern through the declarative interface, and wherein the design pattern meta-model comprises at least two sections selected from, a contexts section that describes where in a design environment user interface the design pattern is accessible, a manifest section that describes one or more resources added to a workspace when the design pattern is applied, a projects section that describes the project types where the design pattern can apply resources, a token groups section that describes the UI pages, and a tokens section that describes information that a user can provide for resource customization when the design pattern is applied;
   providing a user interface (UI) framework that operates to consume the design pattern meta-model and render a set of UI pages that allow for user interaction with the design pattern meta-model during creation of the design pattern; and
   combining, via a pattern processor running on one or more microprocessors, the design pattern meta-model with user inputs from the set of UI pages and producing a set of entities and/or resources that generate the design pattern;
   wherein the UI framework subsequently operates to consume the design pattern and render another set of UI pages that allow for user interaction with the design pattern created using the design pattern meta-model; and
   wherein the pattern processor subsequently operates to combine the design pattern with user inputs from the another set of UI pages and produce another set of entities and/or resources that utilize the design pattern to generate a new software project based on the design pattern created using the design pattern meta-model from the pre-existing software project.

20. The non-transitory machine readable storage medium according to claim 19, wherein said another set of entities and/or resources include a plurality of files which are copied into a user workspace by the pattern processor and wherein the design pattern includes instructions identifying how the plurality of files are processed when they are copied.

* * * * *

UNITED STATES PATENT AND TRADEMARK OFFICE
CERTIFICATE OF CORRECTION

PATENT NO. : 9,021,419 B2  
APPLICATION NO. : 13/769042  
DATED : April 28, 2015  
INVENTOR(S) : Pana et al.

Page 1 of 1

It is certified that error appears in the above-identified patent and that said Letters Patent is hereby corrected as shown below:

On title page 2, item [56] column 2, line 1, delete "Adaptative Objet-Models" and insert -- Adaptive Object-Models --, therefor.

On title page 2, item [56] column 2, line 5, delete "Sciencevol." and insert -- Science vol. --, therefor.

In the specification

Column 7, line 42, delete ""hrc" and insert -- "/src --, therefor.

Column 12, line 64, delete "data" and insert -- data. --, therefor.

Signed and Sealed this  
Ninth Day of February, 2016

Michelle K. Lee  
*Director of the United States Patent and Trademark Office*